(12) United States Patent
Dingli

(10) Patent No.: US 11,891,090 B2
(45) Date of Patent: *Feb. 6, 2024

(54) SYSTEM AND METHOD FOR SURVEILLANCE

(71) Applicant: Pony AI Inc., Grand Cayman (KY)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,346

(22) Filed: Feb. 28, 2022

(65) Prior Publication Data

US 2022/0187826 A1   Jun. 16, 2022

Related U.S. Application Data

(63) Continuation of application No. 16/655,062, filed on Oct. 16, 2019, now Pat. No. 11,262,758.

(51) Int. Cl.
| | |
|---|---|
| *B60W 60/00* | (2020.01) |
| *G05D 1/00* | (2006.01) |
| *G05D 1/02* | (2020.01) |
| *B60Q 1/50* | (2006.01) |
| *B60Q 1/54* | (2006.01) |

(52) U.S. Cl.
CPC ......... *B60W 60/0015* (2020.02); *B60Q 1/509* (2022.05); *B60Q 1/545* (2022.05); *G05D 1/0088* (2013.01); *G05D 1/0214* (2013.01); *G05D 1/0276* (2013.01); *B60Q 1/507* (2022.05); *B60Q 1/525* (2013.01); *G05D 1/0231* (2013.01); *G05D 1/0255* (2013.01); *G05D 1/0257* (2013.01)

(58) Field of Classification Search
CPC .. G05D 1/0088; G05D 1/0214; G05D 1/0276; G05D 1/0231; G05D 1/0255; G05D 1/0257; B60Q 1/50; B60Q 1/525; B60W 40/02; B60W 40/04; B60W 2420/42; B60W 2556/45; B60W 2756/10; B60W 60/0015; B60W 40/06; G06V 20/56; G08G 1/162

See application file for complete search history.

(56) References Cited

U.S. PATENT DOCUMENTS

| | | |
|---|---|---|
| 7,046,169 B2 | 5/2006 | Bucholz |
| 8,040,226 B2 | 10/2011 | Birging |
| 9,701,307 B1 * | 7/2017 | Newman ............... B60W 10/04 |
| 9,958,864 B2 | 5/2018 | Kentley-Klay et al. |
| 11,262,758 B2 | 3/2022 | Dingli |
| 2007/0088488 A1 | 4/2007 | Reeves |

(Continued)

*Primary Examiner* — Rodney A Butler

(57) ABSTRACT

Provided herein is a system and method implemented on a vehicle. The system comprises one or more sensors, one or more processors, and a memory storing instructions that, when executed by the one or more processors, causes the system to perform: obtaining data from the one or more sensors; comparing the obtained data from the one or more sensors with reference data; determining whether one or more characteristics of the obtained data deviate from corresponding characteristics of the reference data by more than a respective threshold; in response to determining that one or more characteristics of the data obtained deviate from corresponding characteristics of the reference data by more than a respective threshold, determining an action of the vehicle based on amounts of the one or more deviations; and performing the determined action.

20 Claims, 8 Drawing Sheets

(56) References Cited

U.S. PATENT DOCUMENTS

| | | |
|---|---|---|
| 2015/0081362 A1 | 3/2015 | Chadwick |
| 2018/0043897 A1* | 2/2018 | Hashimoto ............ G08G 1/167 |
| 2018/0113452 A1* | 4/2018 | Wiechers ................ B60R 25/30 |
| 2018/0229736 A1* | 8/2018 | Narita ...................... G08G 1/16 |
| 2020/0101982 A1 | 4/2020 | Bowers |
| 2020/0200558 A1* | 6/2020 | Xu ..................... G01C 21/3461 |
| 2020/0216079 A1 | 7/2020 | Mahajan |

* cited by examiner

SYSTEM AND METHOD FOR SURVEILLANCE

CROSS REFERENCE TO RELATED APPLICATIONS

This application is a continuation application of U.S. patent application Ser. No. 16/655,062, filed Oct. 16, 2019, the content of each of which are hereby incorporated by reference in their entirety.

TECHNICAL FIELD

The present disclosure relates generally to vehicles such as autonomous vehicles (AVs) monitoring an environment surrounding the vehicle for potential hazardous situations or conditions.

BACKGROUND

On-board sensors in vehicles, such as autonomous vehicles (AVs), supplement and bolster the vehicle's field of vision by providing accurate sensor data. Sensor data is used, for example, in applications of blind spot detection, lane change assisting, rear end radar for collision warning or collision avoidance, park assisting, cross-traffic monitoring, brake assisting, emergency braking, active suspension controlling, and/or automatic distance controlling. Examples of on-board sensors include, for example, passive sensors and active sensors. On-board sensors include camera, Lidar, radar, GPS, sonar, ultrasonic, IMU (inertial measurement unit), accelerometers, gyroscopes, magnetometers, and FIR (far infrared) sensors. However, current vehicles do not monitor conditions or situations surrounding the vehicle when the vehicle is turned off, thus leaving the vehicle vulnerable. Additionally, current vehicles may not monitor all types of conditions or situations while the vehicle is driving. For example, a sensor on a vehicle may not be configured to detect a potential crime or fire, and the vehicle may not take any action even if a potential crime or fire is nearby. These shortfalls are addressed by the present disclosures, which provide an efficient and effective system and method of continuously monitoring for surrounding conditions or situations near a vehicle even when the vehicle is turned off.

SUMMARY

Described herein are systems and methods for a vehicle to detect a potentially hazardous situation or condition near a vehicle. Various embodiments of the present disclosure provide a system of a vehicle comprising: one or more sensors; one or more processors; and a memory storing instructions that, when executed by the one or more processors, causes the system to perform: obtaining data from the one or more sensors; comparing the obtained data from the one or more sensors with reference data; determining whether one or more characteristics of the obtained data deviate from corresponding characteristics of the reference data by more than a respective threshold; in response to determining that one or more characteristics of the data obtained deviate from corresponding characteristics of the reference data by more than a respective threshold, determining an action of the vehicle based on amounts of the one or more deviations; and performing the determined action.

In some embodiments, the determining an action of the vehicle comprises: determining one or more types of the respective one or more characteristics that deviate from corresponding characteristics of the reference data by more than a respective threshold; and determining an action of the vehicle based on the determined types.

In some embodiments, the determining an action of the vehicle comprises determining to move the vehicle to a different location.

In some embodiments, the determining to move the vehicle to a different location comprises selecting a destination location from among destination locations based on a proximity, a safety, or an accessibility of each of the destination locations.

In some embodiments, the determining an action of the vehicle further comprises: determining levels of severity of the one or more deviations between the one or more characteristics of the obtained data and the corresponding characteristics of the reference data; and determining an action of the vehicle based on the determined levels of severity.

In some embodiments, the determining an action of the vehicle further comprises: in response to the vehicle being turned off, determining whether to turn on the vehicle based on the determined levels of severity.

In some embodiments, the determining an action of the vehicle further comprises: determining whether to request an emergency vehicle based on the determined levels of severity.

In some embodiments, the one or more characteristics comprise any of: a road condition, a traffic condition, a weather condition, an environment condition, or a condition of one or more persons.

In some embodiments, the instructions further cause the system to perform: in response to determining that one or more characteristics of the obtained data deviate from corresponding characteristics of the reference data by more than a respective threshold, alerting another vehicle of the deviation.

In some embodiments, the instructions further cause the system to perform: outputting an indication that the one or more sensors are recording data, wherein the indication comprises a visual indication or an audible indication.

Various embodiments of the present disclosure provide a method implemented on a vehicle by a computing system including one or more processors and storage media storing machine-readable instructions, wherein the method is performed using the one or more processors. The method may comprise: obtaining data from the one or more sensors; comparing the obtained data from the one or more sensors with reference data; determining whether one or more characteristics of the obtained data deviates from corresponding characteristics of the reference data by more than a respective threshold; in response to determining that one or more characteristics of the data obtained deviates from corresponding characteristics of the reference data by more than a respective threshold, determining an action of the vehicle based on amounts of the one or more deviations; and performing the determined action.

In some embodiments, the determining an action of the vehicle comprises: determining one or more types of the respective one or more characteristics that deviate from corresponding characteristics of the reference data by more than a respective threshold; and determining an action of the vehicle based on the determined types.

In some embodiments, the determining an action of the vehicle comprises determining to move the vehicle to a different location.

In some embodiments, the determining to move the vehicle to a different location comprises selecting a destination location from among destination locations based on a proximity, a safety, or an accessibility of each of the destination locations.

In some embodiments, the determining an action of the vehicle further comprises: determining levels of severity of the one or more deviations between the one or more characteristics of the obtained data and the corresponding characteristics of the reference data; and determining an action of the vehicle based on the determined levels of severity.

In some embodiments, the determining an action of the vehicle further comprises: in response to the vehicle being turned off, determining whether to turn on the vehicle based on the determined levels of severity.

In some embodiments, the determining an action of the vehicle further comprises: determining whether to request an emergency vehicle based on the determined levels of severity.

In some embodiments, the one or more characteristics comprise any of: a road condition, a traffic condition, a weather condition, an environment condition, or a condition of one or more persons.

In some embodiments, the method further comprises: in response to determining that one or more characteristics of the obtained data deviates from corresponding characteristics of the reference data by more than a respective threshold, alerting another vehicle of the deviation.

In some embodiments, the method further comprises: outputting an indication that the one or more sensors are recording data, wherein the indication comprises a visual indication or an audible indication.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

Various embodiments overcome problems specifically arising in the realm of autonomous vehicle technology. Sensors on a vehicle may assist in finding a stop point (parking spot, drop off or pick up point). In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure.

Figure 1:
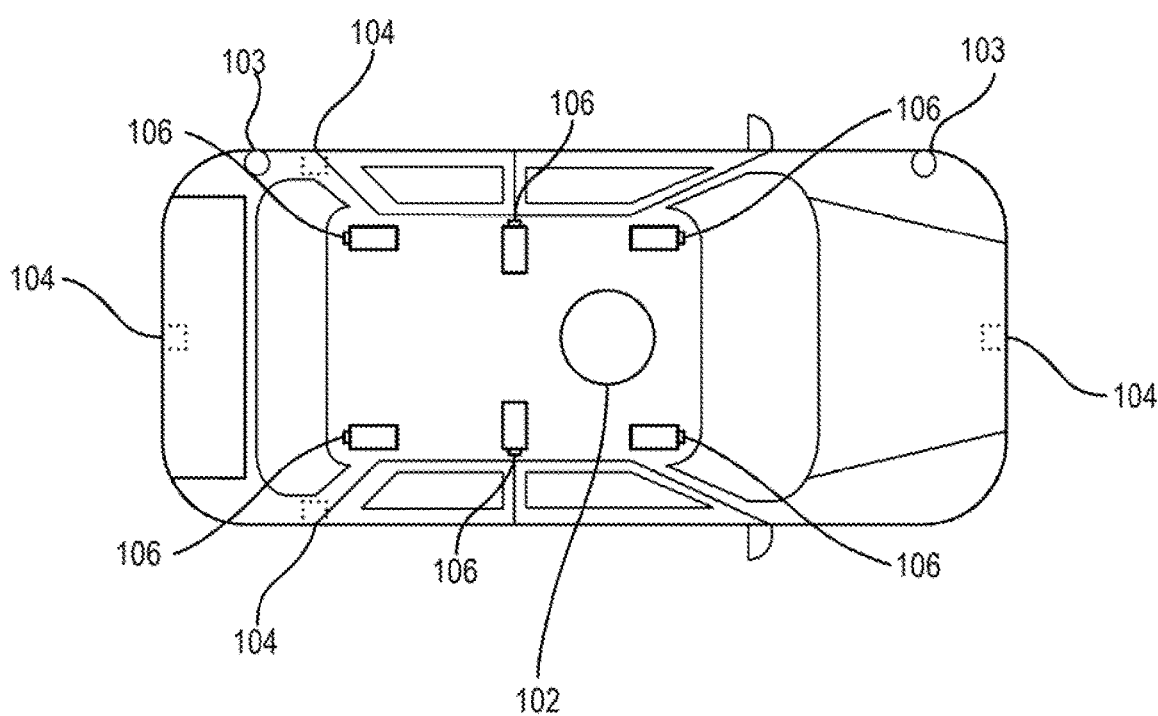
FIG. 1 illustrates an example vehicle, such as an autonomous vehicle (AV), according to an embodiment of the present disclosure.

FIG. 1 illustrates an example vehicle 100 such as an autonomous vehicle, according to an embodiment of the present disclosure. A vehicle 100 generally refers to a category of vehicles that are capable of sensing and driving in a surrounding by itself. The vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The vehicle 100 can also include myriad actuators to propel and navigate the vehicle 100 in the surrounding. Such actuators may include, for example, any suitable electro-mechanical devices or systems to control a throttle response, a braking action, a steering action, etc. In some embodiments, the vehicle 100 can recognize, interpret, and analyze road signs (e.g., speed limit, school zone, construction zone, etc.) and traffic lights (e.g., red light, yellow light, green light, flashing red light, etc.). For example, the vehicle 100 can adjust vehicle speed based on speed limit signs posted on roadways. In some embodiments, the vehicle 100 can determine and adjust speed at which the vehicle 100 is traveling in relation to other objects in the surroundings. For example, the vehicle 100 can maintain a constant, safe distance from a vehicle ahead (e.g., adaptive cruise control). In this example, the vehicle 100 maintains this safe distance by constantly adjusting its vehicle speed to that of the vehicle ahead.

In various embodiments, the vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 100 can effectuate any control to itself that a human driver can on a conventional vehicle. For example, the vehicle 100 can accelerate, brake, turn left or right, or drive in a reverse direction just as a human driver can on the conventional vehicle. The vehicle 100 can also sense environmental conditions, gauge spatial relationships (e.g., distances between objects and itself), detect and analyze road signs just as the human driver. Moreover, the vehicle 100 can perform more complex operations, such as parallel parking, parking in a crowded parking lot, collision avoidance, etc., without any human input.

In various embodiments, the vehicle 100 may include one or more sensors. As used herein, the one or more sensors may include laser scanning systems (e.g., LiDARs) 102, ultrasonic sensors 103, radar systems 104, camera systems 106, GPS, sonar, IMU (inertial measurement unit), accelerometers, gyroscopes, magnetometers, FIR (far infrared) sensors, and/or the like. The one or more sensors allow the vehicle 100 to sense an environment around the vehicle 100. For example, the LiDARs 102 can generate a three-dimensional map of the environment. The LiDARs 102 can also detect objects in the environment. In the example of FIG. 1, the vehicle 100 is shown with four radar systems 104. Two radar systems are coupled to a front-side and a back-side of the vehicle 100, and two radar systems are coupled to a right-side and a left-side of the vehicle 100. In some embodiments, the front-side and the back-side radar systems can be configured for adaptive cruise control and/or accident avoidance. For example, the front-side radar system can be used by the vehicle 100 to maintain a healthy distance from a vehicle ahead of the vehicle 100. In another example, if the vehicle ahead experiences a sudden reduction in speed, the vehicle 100 can detect this sudden change in motion and adjust its vehicle speed accordingly. In some embodiments, the right-side and the left-side radar systems can be configured for blind-spot detection. In the example of FIG. 1, the vehicle 100 is shown with six camera systems 106 on a roof of the vehicle 100. Two camera systems are coupled to the front-side of the roof of the vehicle 100, two camera systems are coupled to the back-side of the roof of the vehicle 100, and two camera systems are coupled to the right-side and the left-side of the roof of the vehicle 100. In some embodiments, the front-side and the back-side camera systems can be configured to detect, identify, and decipher objects, such as cars, pedestrian, road signs, in the front and the back of the vehicle 100. For example, the front-side camera systems can be utilized by the vehicle 100 to determine speed limits. In some embodiments, the right-side and the left-side camera systems can be configured to detect objects, such as lane markers. For example, side camera systems can be used by the vehicle 100 to ensure that the vehicle 100 drives within its lane.

Figure 2A:
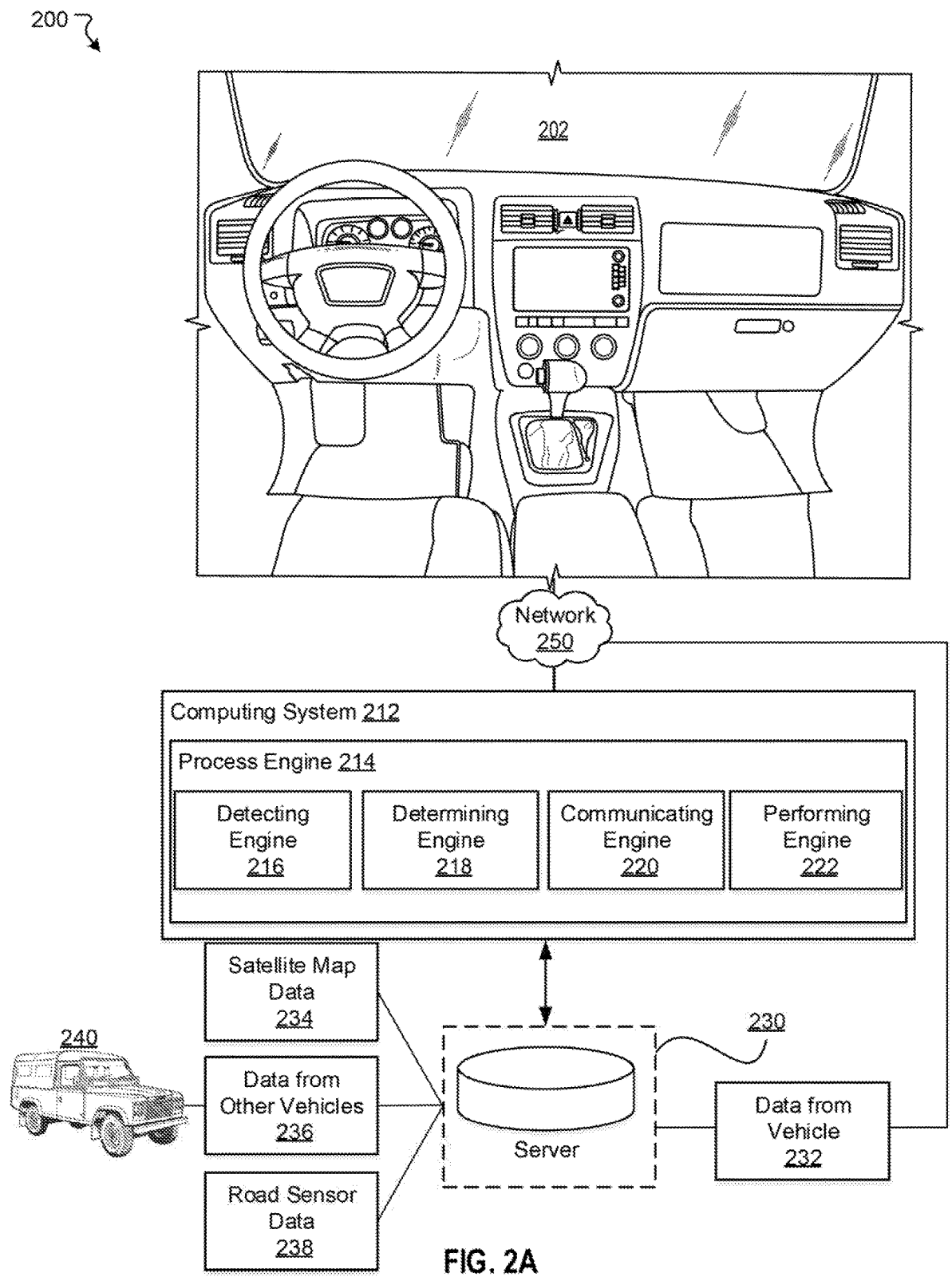
FIG. 2A illustrates an example environment of a system that performs an action on a vehicle such as the vehicle of FIG. 1, according to an embodiment of the present disclosure.

FIG. 2A illustrates an example environment 200 of a system that performs an action on a vehicle 202. In various embodiments, the vehicle 202 may be implemented as vehicle 100. The vehicle 202 may utilize its sensors including LiDAR, radar, camera, GPS, and/or ultrasonic sensors, as described with respect to the vehicle 100, to obtain data. The vehicle 202 may be connected, over a network 250, to at least one computing system 212 that includes one or more processors and memory. The processors may be configured to perform various operations by interpreting machine-readable instructions. In some embodiments, the example environment 200 may be implemented as a data platform. In some embodiments, the example environment 200 may be configured to interact with computing systems of the data platform. In various embodiments, one or more computing systems 212 of the data platform may receive and process search queries to obtain data from one or more sensors, compare the obtained data from the one or more sensors with reference data, determine whether one or more characteristics of the obtained data deviates from corresponding characteristics of the reference data by more than a respective threshold, in response to determining that one or more characteristics of the data obtained deviates from corresponding characteristics of the reference data by more than a respective threshold, determine an action of the vehicle based on amounts of the one or more deviations, and/or perform the determined action. In some embodiments, the one or more computing systems 212 may be physically and/or electrically connected to the vehicle 202. In some embodiments, the one or more computing systems 212 may be integrated as part of the vehicle 202.

In some embodiments, the computing system 212 may include a process engine 214. The process engine 214 may include a detecting engine 216, a determining engine 218, a communicating engine 220, and a performing engine 222. The process engine 214 may be executed by the processor(s) of the computing system 212 to perform various operations including those operations described in reference to the detecting engine 216, the determining engine 218, the communicating engine 220, and the performing engine 222. In general, the process engine 214 may be implemented, in whole or in part, as software that is capable of running on one or more computing devices or systems. In one example, the process engine 214 may be implemented as or within a software application running on one or more computing devices (e.g., user or client devices) and/or one or more servers (e.g., network servers or cloud servers, servers 230). In some instances, various aspects of the detecting engine 216, the determining engine 218, the communicating engine 220, and the performing engine 222 may be implemented in one or more computing systems and/or devices. In some instances, one or more of the detecting engine 216, the determining engine 218, the communicating engine 220, and the performing engine 222 may be combined or integrated into a single processor, and some or all functions performed by one or more of the detecting engine 216, the determining engine 218, the communicating engine 220, and the performing engine 222 may not be spatially separated, but instead may be performed by a common processor. The environment 200 may also include the one or more servers 230 accessible to the computing system 212. The one or more servers 230 may store pictorial and map data 232 from the vehicle 202, satellite map data 234 from one or more satellite maps, other vehicle data 236 from one or more sensors of another vehicle 240, and/or road sensor data 238 from one or more road sensors such as sensors on traffic lights. In some embodiments, the one or more servers 230 may integrate data from different sensors. In other embodiments, the one or more servers 230 may keep the data from the different sensors separate. The one or more servers 230 may be accessible to the computing system 212 either directly or over the network 250. In some embodiments, the one or more servers 230 may store data that may be accessed by the process engine 214 to provide the various features described herein. In some instances, the one or more servers 230 may include federated data stores, databases, or any other type of data source from which data may be stored and retrieved, for example. In some implementations, the one or more servers 230 may include various types of data sets on which determinations of accuracy or consistency with other information can be made. In general, a user operating a computing device can interact with the computing system 212 over the network 250, for example, through one or more graphical user interfaces and/or application programming interfaces.

The detecting engine 216 may be configured to obtain sensor data, for example, using the one or more sensors as described with respect to vehicle 100, or from the one or more servers 230. The detecting engine 216 may continuously obtain the sensor data or obtain the sensor data at discrete time intervals. The detecting engine 216 may increase a sampling rate of obtaining the sensor data in response to determining that one or more parameters of the obtained sensor data are outside a range. The detecting engine 216 may utilize object detection and tracking algorithms. The obtained sensor data may comprise pictorial or image data captured in either real-time or with a time delay. The obtained sensor data may further comprise timestamp data indicating a time of capture of the sensor data. The obtained sensor data may include information of road conditions or traffic conditions, (e.g., traffic accident, traffic congestion, or road failure, construction, detour, road block, bumpy road, or an additional road sign), environment conditions or weather conditions (e.g., fire, explosion, flood, or earthquake, pollution, smog, tornado, monsoon), health conditions (e.g., stroke or heart attack of a person) or other emergencies (e.g., robbery or shooting). The obtained sensor data may include an image captured from the one or more sensors, or one or more specific features (such as other vehicles, trees, road, grass, landmarks, people, inanimate objects) extracted from the image. The one or more sensors of the detecting engine 216 may also detect vehicle speed, vehicle direction, vehicle acceleration, vehicle rotation, and/or vehicle location. The detecting engine 216 may be completely or partially turned on when the vehicle 202 is powered off in order to detect potential hazards or conditions even when the vehicle is not on. The detecting engine 216 may include an object detection system that operates while the vehicle 202 is turned off to detect stationary objects or entities or moving objects, features, or entities. When the vehicle is not on and the detecting engine 216 is partially turned off, sensor data may instead be obtained from the server 230, which includes the satellite map data 234, the other vehicle data 236, and the road sensor data 238.

The determining engine 218 may be configured to process and/or analyze the sensor data. In some embodiments, the determining engine 218 may obtain data from the one or more sensors and compare the obtained data from the one or more sensors with reference data. In some embodiments, the reference data may comprise historical data, may which refer to, as an example, an image, or one or more specific features of the image. The historical data may have been captured at a specific location, for example, taken at a same location as the sensor data. Historical data may be information already verified to be accurate. Historical data may be images from other sensors and/or onboard 3D map data. In some embodiments, the determining engine 218 may determine whether one or more characteristics of the obtained data deviates from corresponding characteristics of the reference data by more than a respective threshold. As an example, the determining engine 218 may determine how closely the obtained data matches with the reference data. As an example, how closely the obtained data matches with the reference data may be based on a proportion of features present in the reference data that are also in common with the obtained data, or, of the features that are in common between the reference data and the obtained data, how closely each of the features matches (e.g. a degree of similarity between each of the features).

In some embodiments, the reference data may comprise one or more images of other locations, such as those locations with similar demographic, geographical, and statistical data as a current location of the vehicle 202. In some embodiments, the determining engine 218 may determine whether one or more characteristics of the obtained data, such as a density or population of people in a specific region such as within a specific threshold radius of the vehicle 202, one or more actions of the people in the specific region such as whether the people are carrying or brandishing objects such as weapons including knives and guns, a density of vehicles, a density of emergency vehicles, a temperature, air quality, or barometric pressure, deviates from corresponding characteristics of the reference data by more than a respective threshold. In some embodiments, the determining engine 218 may, in response to determining that one or more characteristics of the obtained data deviates from corresponding characteristics of the reference data by more than a respective threshold, classify a hazard of a current situation by determining a type or types of the respective one or more characteristics that deviate from corresponding characteristics of the reference data by more than a respective threshold. The determining engine 218 may determine an action of the vehicle 202 based on amounts of the one or more deviations, one or more levels of severity of the one or more deviations, how many characteristics deviate from corresponding characteristics of the reference data by more than a respective threshold, a type of the deviation, and/or a classification of a situation. For example, the determining engine 218 may determine that a density of emergency vehicles is higher than in the reference data, and thereby classify a current situation as an emergency situation. In some examples, the determining engine 218 may further determine that a temperature, air quality index, and a particulate or smoke concentration is higher than in the reference data, and further recognize smoke or fire in the obtained data. The determining engine 218 may determine that the type of hazard is a fire or a natural disaster and may control the vehicle 202 to immediately evacuate to a different location. In some examples, the determining engine 218 may determine that a moisture concentration is higher than in the reference data, and determine that the type of hazard is rain, flooding, or, if the flooding reaches a threshold level, a natural disaster. If the flooding has reached a threshold height, meaning that the moisture concentration in the obtained sensor data deviates from a moisture concentration in the reference data by more than a threshold amount, the determining engine 218 may control the vehicle 202 to move to a different location if feasible. In some examples, the determining engine may determine that both a density of emergency vehicles is higher than in the reference data, and that the air quality index is higher than in the reference data. Based on two characteristics deviating from the reference data, the determining engine 218 may classify a current situation a current situation as an emergency situation and control the vehicle 202 to move to a different location.

Figure 2B:
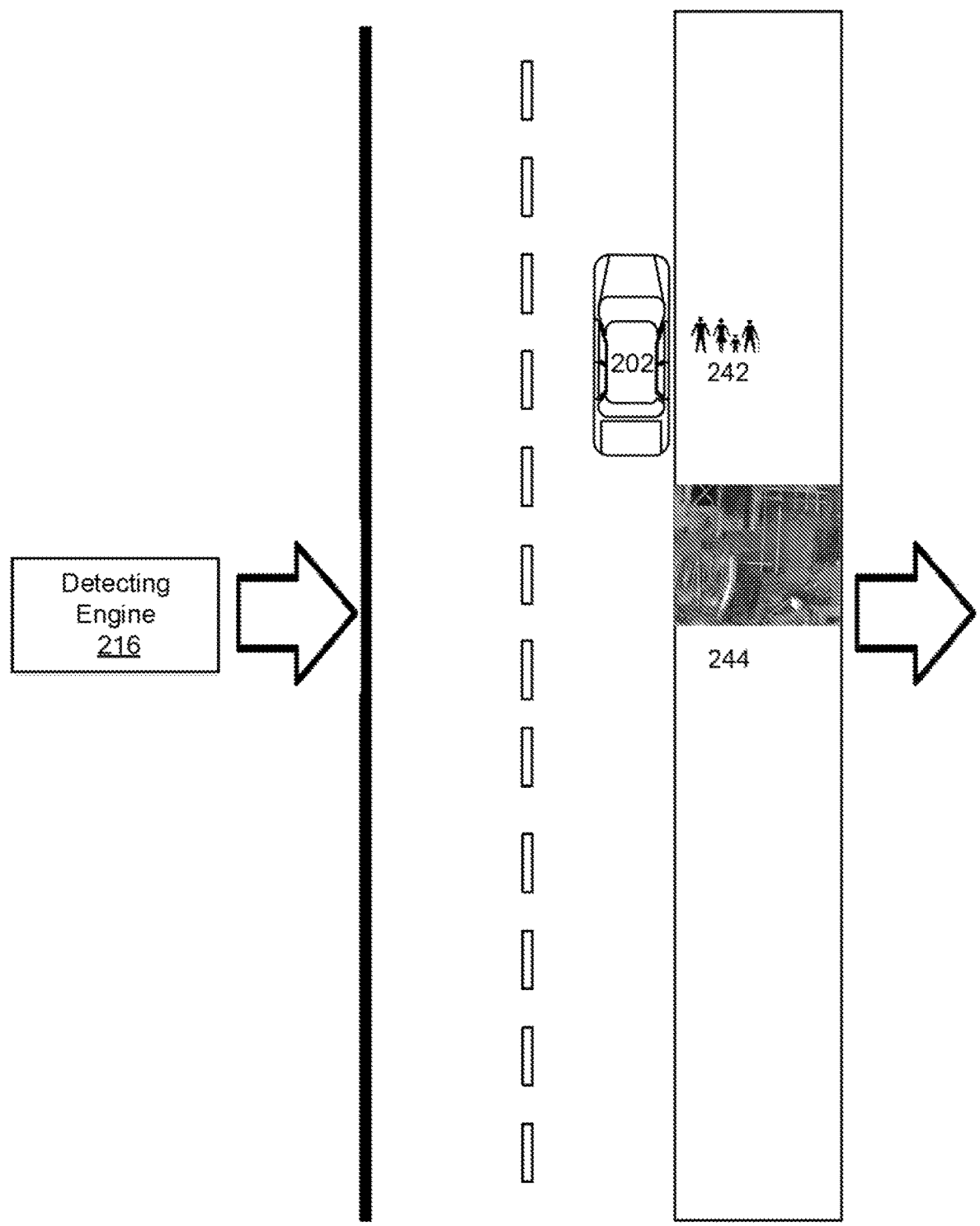
FIG. 2B illustrates an example operation of a computing system, for example, including a detecting engine, a determining engine, and a communicating engine, according to an embodiment of the present disclosure.
Figure 2B:
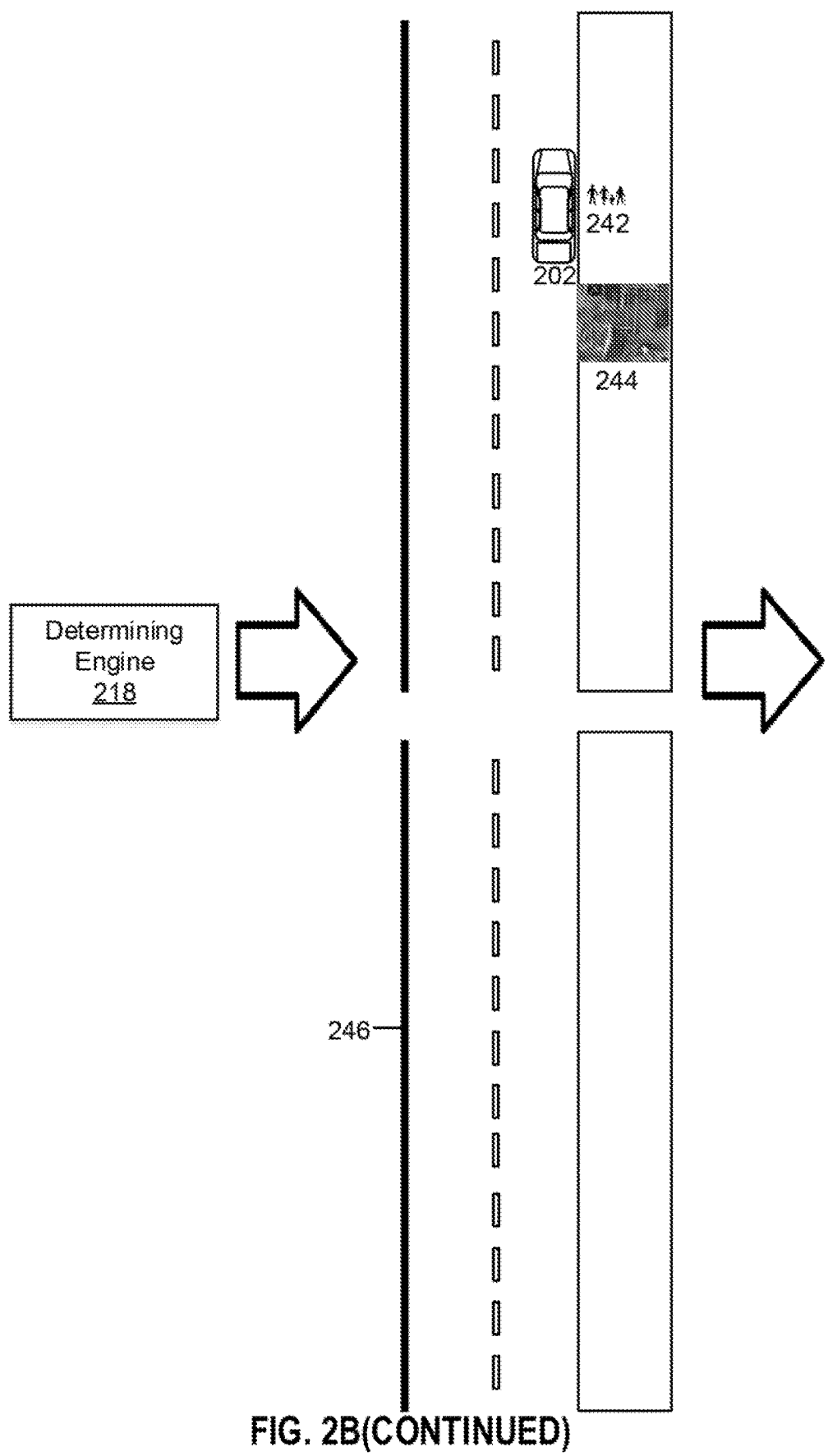
Figure 2B:
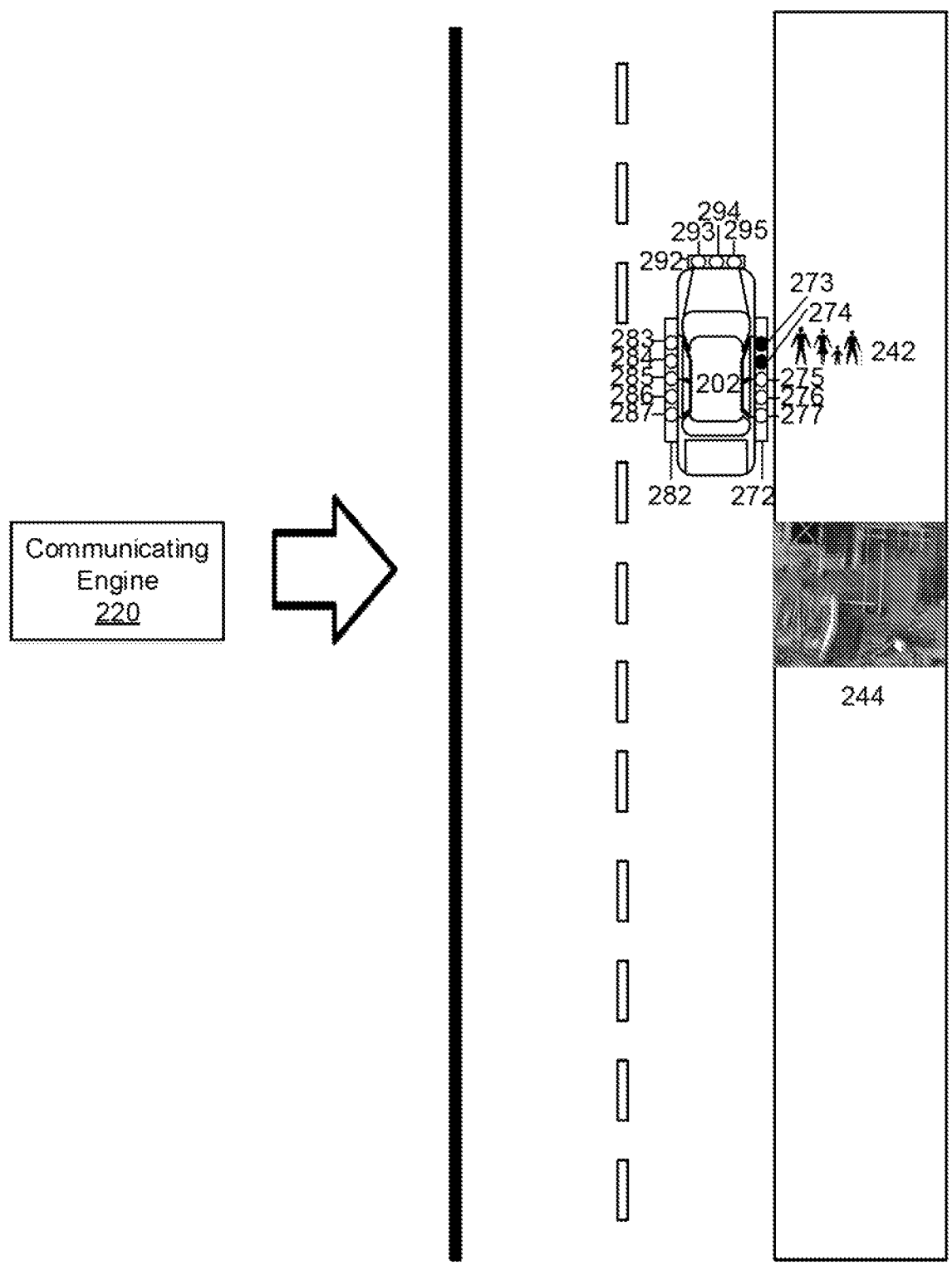

In some examples, as shown in FIG. 2B, the determining engine 218 may determine that the type of hazard is that one or more persons may be approaching the vehicle 202 if the one or more persons are within a threshold distance of the vehicle 202, and/or the one or more persons are moving in a direction towards the vehicle 202 at a higher than threshold velocity. The determining engine 218 may determine that the type of hazard is an emergency situation. The determining engine 218 may sound an alarm, either a visual or an audible alarm, and may move the vehicle 202 to a different location.

In some embodiments, the determining engine 218 may be configured to determine a proportion of the one or more features of the obtained sensor data that matches the one or more features of the reference data and determine whether the proportion is less than a threshold. For example, the determining engine 218 may determine whether one or more common feature(s) (such as another vehicle, person, construction site, roadblock, sign) is present in both the obtained sensor data and the reference data, of the features that are present in the obtained sensor data. If the proportion is less than the first threshold, the determining engine 218 may determine that a condition or hazard exists, or, that further testing is desired to determine whether a condition or hazard exists. In other embodiments, in addition or in place of determining whether the proportion is less than the first threshold, the determining engine 218 may determine a degree of similarity of individual features between the obtained sensor data and the reference data. For example, of the features of the obtained sensor data that matches the one or more features of the reference data, the determining engine 218 may select one, some, or all of the aforementioned matching features, and determine how closely each of the selected feature(s) matches between the obtained sensor data and the reference data (e.g. a degree of similarity between each of the features). If each of the selected feature(s) matches sufficiently between the obtained sensor data and the reference data, the determining engine 218 may determine that the condition or hazard exists. If some or all of the selected features(s) does not sufficiently match between the obtained sensor data and the reference data, the determining engine 218 may determine that further testing is desired of whether a condition or hazard exists, or that the condition or hazard exists.

For example, if one, some, or all of the features of the reference data exhibits a similarity with the obtained sensor data of greater than a threshold (e.g., if a degree of similarity exceeds a threshold, between one or more features of the sensor data and corresponding features of the reference data), the determining engine 218 may determine that no condition or hazard exists. In some embodiments, if the similarity is less than a second threshold, the determining engine 218 may determine that a condition or hazard exists, or that further testing may be desired to determine whether a condition or hazard exists. In some embodiments, if the similarity is within a range or between two thresholds, the determining engine 218 may determine that further testing may be desired to determine whether a condition or hazard exists. For example, further testing may be done on the basis of second data taken at a different time and/or by a different sensor, or based on other readings or data generated or processed by the one or more sensors.

In some embodiments, the determining engine 218 may verify the readings and/or data from the one or more sensors with readings and/or data from the same one or more sensors at a different time, or another sensor of a same or different modality at a same time or a different time.

Figure 2C:
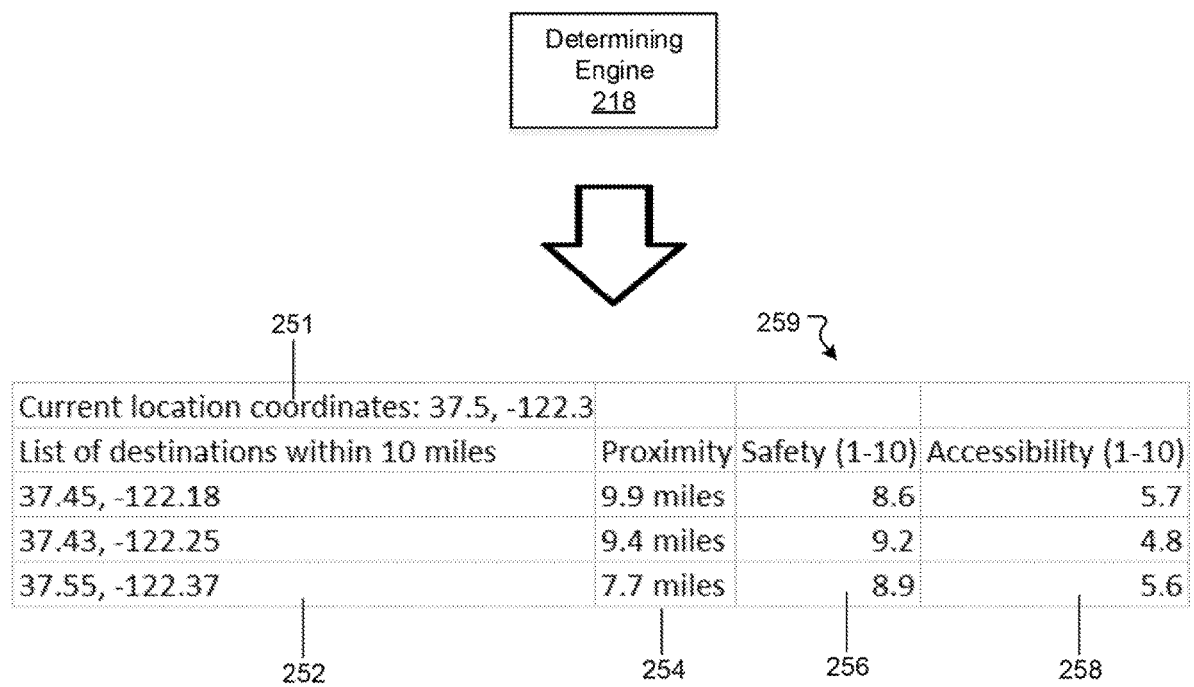
FIG. 2C illustrates an example interface showing outputs in a determining engine, in accordance with various embodiments.

In some embodiments, the determining engine 218 may be configured to determine to move the vehicle 202 to a different location. In some embodiments, the determining engine 218 may select a destination location from among destination locations based on a proximity, a safety, or an accessibility of each of the destination locations, as shown in FIG. 2C.

In some embodiments, the determining engine 218 may further be configured to determine whether to turn on the vehicle 202, if the vehicle 202 is turned off, based on the determined levels of severity of the one or more deviations between the one or more characteristics of the obtained data and the corresponding characteristics of the reference data, amounts of the deviations, and/or the determined types of the respective one or more characteristics that deviate from corresponding characteristics of the reference data by more than a respective threshold. In some examples, if the determined levels of severity and/or the amounts of the deviations exceed respective thresholds, the determining engine 218 may determine to turn on the vehicle 202, trigger an alarm, either audio or visual, on the vehicle 202, to move the vehicle 202 to a different location, and/or request an emergency vehicle such as a police car, fire truck, or ambulance. In some examples, if the determined types of the respective one or more characteristics that deviate from corresponding characteristics of the reference data by more than a respective threshold include: an emergency situation or a natural disaster, the determining engine 218 may determine to turn on the vehicle 202 to move the vehicle 202 to another location. In some examples, if the determined types of the respective one or more characteristics that deviate from corresponding characteristics of the reference data by more than a respective threshold include: an emergency situation or a natural disaster, the determining engine 218 may determine to request an emergency vehicle.

In some examples, if the vehicle 202 is turned off and some sensors of the detecting engine 216 are inactive, the determining engine 218 may determine whether to activate the sensors of the detecting engine 216 that were inactive, based on the determined levels of severity of the one or more deviations between the one or more characteristics of the obtained data and the corresponding characteristics of the reference data, amounts of the deviations, and/or the determined types of the respective one or more characteristics that deviate from corresponding characteristics of the reference data by more than a respective threshold.

In some embodiments, the communicating engine 220 may be configured to alert another vehicle located within a radius of the vehicle 202, such as the another vehicle 240, in response to the determined levels of severity of the one or more deviations between the one or more characteristics of the obtained data and the corresponding characteristics of the reference data being higher than a threshold, and/or, amounts of the deviations exceeding a threshold. In some embodiments, the communicating engine 220 may be configured to alert another vehicle located within a radius of the vehicle 202, based on the determined types of the respective one or more characteristics that deviate from corresponding characteristics of the reference data by more than a respective threshold. In some examples, the communicating engine 220 may be configured to alert another vehicle located within a radius of the vehicle 202 if the determined type or types include an emergency situation or a natural disaster. The communicating engine 220 may, in some embodiments, further output an indication that the one or more sensors in the detecting engine 216 are recording data via a visual indication or an audible indication. In some examples, the visual indication may comprise a written notice that the one or more sensors are recording data, or a flashing, blinking, or illuminated light or series of light patterns. The communicating engine 220 may discourage dangerous, destructive, or illegal behavior by providing the indication.

The communicating engine 220 may, in some embodiments, send data from the detecting engine 216 and the determining engine 218 via a high-speed data link, to a remote operation center, a vehicle fleet operator, police, or an owner of the vehicle 202, for review, and receive input from the remote operation center, vehicle fleet operator, police, or owner regarding what action the vehicle 202 should undertake. In some embodiments, the communicating engine 220 may require feedback or approval from a remote human operator prior to taking any action. The performing engine 222 may control the vehicle 202 to perform the determined action such as moving the vehicle 202.

FIG. 2B illustrates an example operation of a computing system of FIG. 2A. For example, FIG. 2B illustrates an example operation of a detecting engine of the computing system 212, such as detecting engine 216, a determining engine such as determining engine 218, and a communicating engine such as communicating engine 220, from FIG. 2A. In FIG. 2B, the detecting engine 216 of the vehicle 202 may detect, with its sensors or other vehicle data 236 from other vehicles such as the another vehicle 240, satellite map data 234, or road sensor data 238, a potentially unsafe condition or hazard, for example, while the vehicle 202 is turned off or stopped. In some examples, the detecting engine 216 may detect a crowd of people, shown as persons 242, and construction 244. The detecting engine 216 may determine how long the persons 242 have been loitering or standing in a same area, actions that the persons 242 have been taking or have taken, objects or weapons that the persons 242 are possessing, a velocity at which the persons 242 are traveling towards the vehicle 202, and/or a number of persons 242 within a radius of the vehicle 202. The detecting engine 216 may further detect construction 244. In some examples, the detecting engine 216, using its sensors and/or other sensor data, may detect a potentially unsafe condition based on a smog level, a pollution level as measured by an air quality index (AQI), a noise level, an amount of lighting, and/or a temperature gradient (for example, which may indicate burning or a fire) within a radius of the vehicle 202. For example, the detecting engine 216 may detect a potentially unsafe condition if the smog level, AQI, noise level, and/or the temperature gradient exceeds a threshold, and/or if an amount of lighting at night is less than a threshold. In some examples, the detecting engine 216 may detect a potentially harmful object such as glass or garbage within a radius of the vehicle 202.

The detecting engine 216 may transmit the acquired data to the determining engine 218. The determining engine 218 may compare the data acquired by the detecting engine 216 with reference data 246, and determine that the persons 242 and the construction 244 are characteristics that deviate from the reference data 246. The determining engine 218 may determine an action based on an amount of the deviation, such as, how long the persons 242 have been loitering or standing in a same area, actions that the persons 242 have been taking or have taken, objects or weapons that the persons 242 are possessing, a velocity at which the persons 242 are traveling towards the vehicle 202, and/or a number of persons 242 within a radius of the vehicle 202. In some embodiments, a greater amount of the deviation may result in the determining engine 218 determining a more extreme or drastic action. The determining engine 218 may further determine an action based on how much noise is at a construction site, a number of people at the construction site, how much space the construction site takes up, and/or how long the construction site has been active for. In some examples, the determining engine 218 may determine to trigger an alert or to move or the vehicle 202.

The communicating engine 220 may provide a visual or audio indication that the vehicle 202 is recording data. In some embodiments, the visual indication may comprise an array 272 of lights, which may include lights 273, 274, 275, 276, and 277, on a right side of the vehicle 202, an array 282 of lights, which may include lights 283, 284, 285, 286, and 287, on a right side of the vehicle 202, and an array 292 of lights, which may include lights 293, 294, and 295, on a front portion of the vehicle 202. In some embodiments, the arrays 272, 282, and 292 may comprise any number of lights. Five lights in the arrays 272 and 282, or three lights in the array 292, are shown merely for illustrative purposes. Which of the arrays 272, 282, and 292 may be flashing or illuminated may depend a direction that a potential hazard or danger is coming from. In the example of FIG. 2B, since the persons 242 and the construction 244 are both to a right side of the vehicle 202, the array 272 on the right side of the vehicle 202 may be flashing or illuminated, while the other arrays 282 and 292 may not be flashing or illuminated because no potential hazard or danger was detected in those directions.

The array 272 of lights may be flashing, pulsing or moving from side to side or back and forth. As an example, only one or only some of the lights 273, 274, 275, 276, and 277 in the array 272 may be illuminated, flashing, or flickering at one time. Initially, only the lights 273 and 274 may be illuminated, flashing, or flickering because they may be closest to one of the potential hazards or dangers (e.g., persons 242). Alternatively, different lights of the array 272 may be illuminated, flashing, or flickering at different times. For example, the lights 273 and 277 may be illuminated, flashing, or flickering; next, the lights 277 and 276 may be illuminated, flashing, or flickering; subsequently, the lights 276 and 275 may be illuminated, flashing, or flickering. In some embodiments, one, three, four, or five lights 273, 274, 275, 276, and 277 may be illuminated, flashing, or flickering at one time, and the flash pattern may proceed similarly to that described above for a case of two lights being illuminated, flashing, or flickering.

FIG. 2C illustrates an example interface showing outputs in a determining engine, in accordance with various embodiments. In some embodiments, the determining engine 218 of FIG. 2A may, in response to determining that the vehicle 202 is to be moved, output a list of destinations within a certain radius of the vehicle 202. In some embodiments, the determining engine 218 may select a destination location from among destination locations based on a proximity, a safety, and/or an accessibility, of each of the destination locations. In some embodiments, the determining engine 218 may output information 259 of destinations 252 within a radius (e.g., 10 miles) of a current location 251 of the vehicle 202. The information 259 may further comprise a proximity 254 of each of the destinations 252, a safety 256 of each of the destinations 252, and an accessibility 259 of each of the destinations 252. In some embodiments, the determining engine 218 may select a destination location based on its proximity to a current destination. In some embodiments, the determining engine 218 may select a destination location based on its safety. The safety of a destination may be determined by historical crime data, or based on recent or real-time sensor data at the destination measured, for example, by satellite map data 234 from one or more satellite maps, other vehicle data 236 from one or more sensors of another vehicle 240, and/or road sensor data 238. For example, the recent or real-time sensor data may comprise whether police activity was recently detected at or near the destination within a radius, how many traffic accidents recently occurred at or near the destination within a radius, and whether it would be legal to stop at the destination. In some examples, the legality of the destination may be dependent or based on how long the vehicle 202 is required to, or desires to, stop at the destination, and on a type of the destination. For example, the type of the destination may indicate whether the destination is intended for short-term stopping (for example, a pick up or drop off point) or long-term parking. For example, if the vehicle 202 is merely picking up or dropping off, the vehicle 202 may legally occupy either of a destination intended for short-term stopping or a destination intended for long-term parking. If the vehicle 202 requires, or requests, parking for a duration extending beyond that of a pick up or drop off, the vehicle 202 may not legally occupy a destination intended for a pick up or drop off point. In some embodiments, the determining engine 218 may select a destination based on accessibility, which may comprise, an availability of parking spots at the destination, as determined by satellite map data 234 from one or more satellite maps, other vehicle data 236 from one or more sensors of another vehicle 240, and/or road sensor data 238, a difficulty of entry, and one or more road conditions such as slope or bumpiness. In some examples, the determining engine 218 may select a destination having a minimum difficulty of entry, such as one not requiring reverse parking for entry. In some examples, the determining engine 218 may select a destination with a road having a slope under a threshold, or a road having a bumpiness under a threshold.

Figure 3:
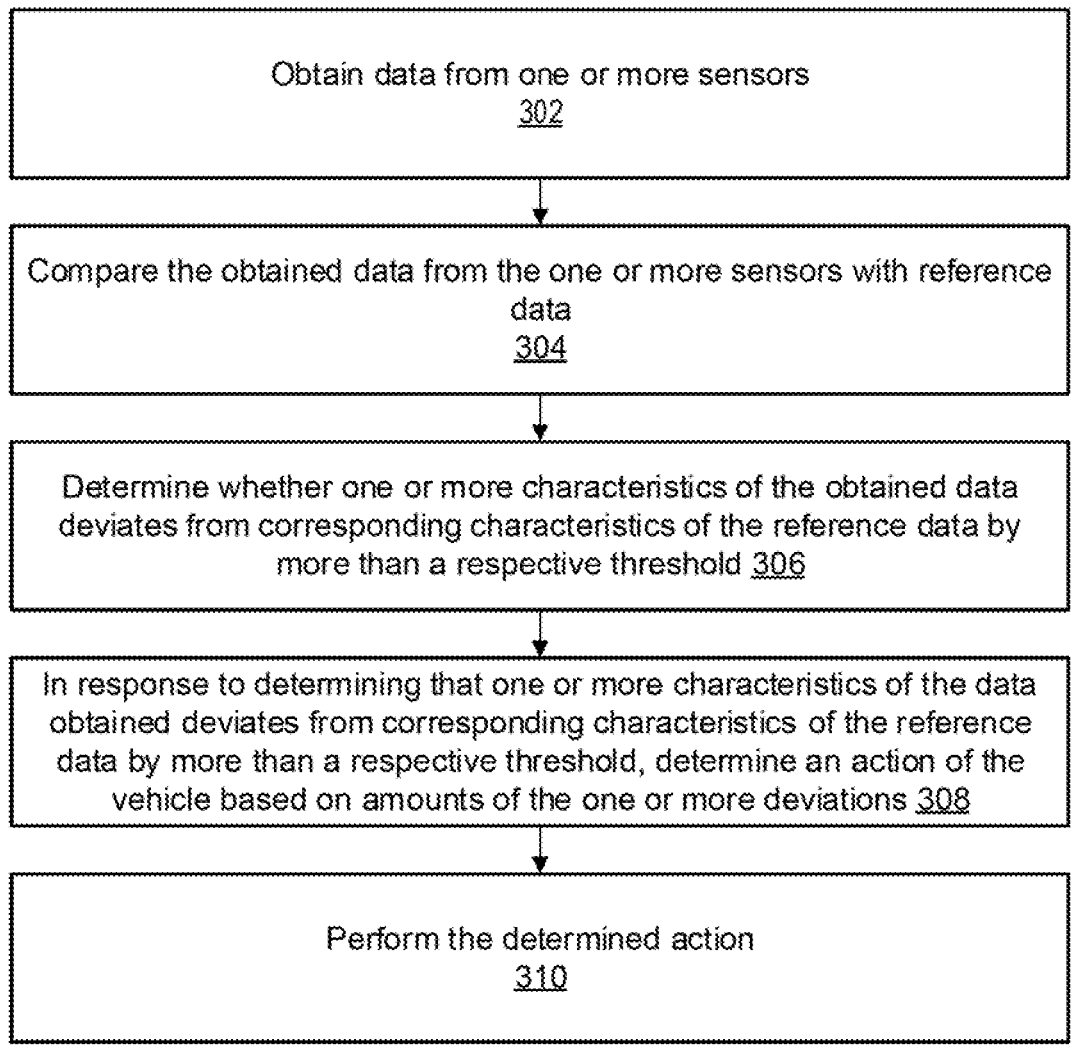
FIG. 3 illustrates a flowchart of an example of a method to perform an action on a vehicle, according to some embodiments.

FIG. 3 illustrates a flowchart of a method to determine and select a stop point according to some embodiments. In this and other flowcharts, the flowchart 300 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 3.

In step 302, data may be obtained from one or more sensors. In step 304, the obtained data from the one or more sensors may be compared with reference data. Step 306 may comprise determining whether one or more characteristics of the obtained data deviates from corresponding characteristics of the reference data by more than a respective threshold. Step 308 may comprise: in response to determining that one or more characteristics of the data obtained deviates from corresponding characteristics of the reference data by more than a respective threshold, determining an action of the vehicle based on amounts of the one or more deviations. Step 310 may comprise performing the determined action.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
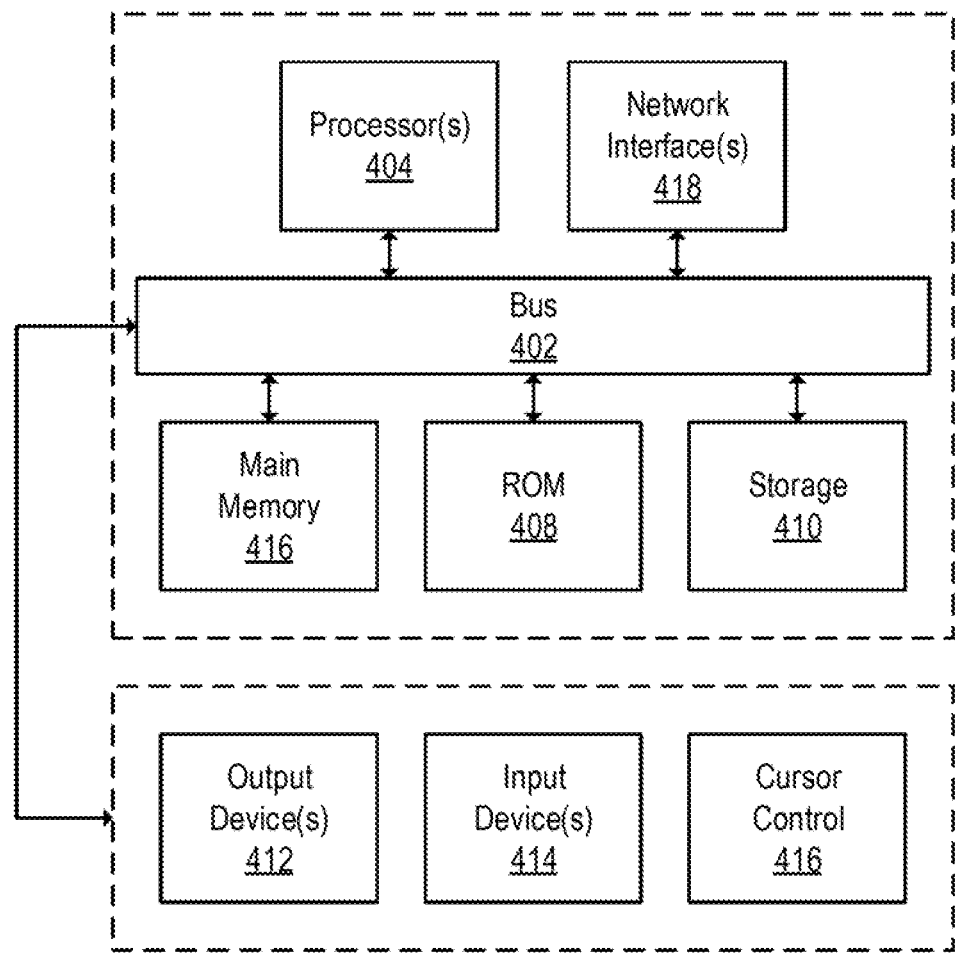
FIG. 4 is a diagram of an example computer system for implementing the features disclosed herein.

FIG. 4 is a block diagram that illustrates a computer system 400 upon which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to output device(s) 412, such as a cathode ray tube (CRT) or LCD display (or touch screen), for displaying information to a computer user. Input device(s) 414, including alphanumeric and other keys, are coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
   one or more sensors;
   one or more processors; and
   a memory storing instructions that, when executed by the one or more processors, causes the system to perform:
   when a vehicle is in an inactive status, obtaining first data from first sensors associated with the vehicle, and from one or more second sensors associated with a different vehicle, wherein the first sensors comprise a first portion of sensors associated with the vehicle that are active when the vehicle is in the inactive status, the sensors comprising a Lidar, an ultrasonic sensor, a radar sensor, a camera, a global positioning system (GPS), and an inertial measurement unit (IMU);
   comparing the obtained first data from the first sensors with reference data;
   determining whether one or more first characteristics of the obtained first data deviate from corresponding characteristics of the reference data by more than respective first thresholds;
   in response to determining that one or more characteristics of the data obtained deviate from corresponding characteristics of the reference data by more than respective first thresholds:
      activating a second portion of the sensors that were previously inactive on the vehicle when the vehicle is in the inactive status;
      increasing a sampling rate of the first sensors; and obtaining second data from the second portion of the sensors and the first sensors:

determining whether to evacuate a vehicle based on amounts by which second characteristics of the second data deviate from the corresponding characteristics of the reference data; and in response to determining to evacuate the vehicle:
determining a mode of evacuation of the vehicle and determining an evacuation location from evacuation locations; and evacuating the vehicle based on the determined mode and the evacuation location.

2. The system of claim 1, wherein the obtaining of data additionally comprises determining an air quality index (AQI) within the threshold radius of the vehicle; and the determination of whether to evacuate the vehicle is additionally based on the AQI.

3. The system of claim 1, wherein the obtaining of data additionally comprises determining objects carried by persons at a current location and respective levels of danger of the objects; and the determination of whether to evacuate the vehicle is additionally based on the levels of danger of the objects carried by the persons.

4. The system of claim 1, wherein the obtaining of data additionally comprises determining whether a natural disaster is arising within the threshold radius, the natural disaster comprising a fire or a flooding; and the determination of whether to evacuate the vehicle is additionally based on the determination of whether a natural disaster is arising.

5. The system of claim 4, wherein the determination of whether a natural disaster is arising is based on a temperature gradient.

6. The system of claim 1, wherein:
the data is indicative of an instantaneous density of other vehicles within a threshold radius of the vehicle;
the comparing of the obtained data comprises comparing the instantaneous density to a baseline level of a density of vehicles; and
the determination of whether of evacuate is in response to determining that the instantaneous density of other vehicles deviates from the baseline level by more than a threshold amount.

7. The system of claim 1, wherein:
the data is indicative of a particulate concentration or a smoke concentration within a threshold radius of the vehicle;
the comparing of the obtained data comprises comparing the particulate concentration or the smoke concentration to a baseline level of a particulate concentration or a smoke concentration; and
the determination of whether of evacuate is in response to determining that the particulate concentration or the smoke concentration deviates from the baseline level by more than a threshold amount.

8. The system of claim 1, wherein the instructions further cause the system to perform:
determining one or more velocities at which one or more persons are travelling towards the vehicle; and
the determination of whether of evacuate is based on the one or more velocities.

9. A method implemented by a computing system including one or more processors and storage media storing machine-readable instructions, wherein the method is performed using the one or more processors, the method comprising:

when a vehicle is in an inactive status, obtaining first data from first sensors associated with the vehicle, and from one or more second sensors associated with a different vehicle, wherein the first sensors comprise a first portion of sensors associated with the vehicle that are active when the vehicle is in the inactive status, the sensors comprising a Lidar, an ultrasonic sensor, a radar sensor, a camera, a global positioning system (GPS), and an inertial measurement unit (IMU);

comparing the obtained first data from the first sensors with reference data;

determining whether one or more first characteristics of the obtained first data deviate from corresponding characteristics of the reference data by more than respective first thresholds;

in response to determining that one or more characteristics of the data obtained deviate from corresponding characteristics of the reference data by more than respective first thresholds:

activating a second portion of the sensors that were previously inactive on the vehicle when the vehicle is in the inactive status;

increasing a sampling rate of the first sensors; and obtaining second data from the second portion of the sensors and the first sensors;

determining whether to evacuate a vehicle based on amounts by which second characteristics of the second data deviate from the corresponding characteristics of the reference data; and in response to determining to evacuate the vehicle:
determining a mode of evacuation of the vehicle and determining an evacuation location from evacuation locations; and evacuating the vehicle based on the determined mode and the evacuation location.

10. The method of claim 9, wherein the obtaining of data additionally comprises determining an air quality index (AQI) within the threshold radius of the vehicle; and the determination of whether to evacuate the vehicle is additionally based on the AQI.

11. The method of claim 9, wherein the obtaining of data additionally comprises determining objects carried by persons at a current location and respective levels of danger of the objects; and the determination of whether to evacuate the vehicle is additionally based on the levels of danger of the objects carried by the persons.

12. The method of claim 9, wherein:
the obtaining of data additionally comprises determining whether a natural disaster is arising within the threshold radius, the natural disaster comprising a fire or a flooding; and
the determination of whether to evacuate the vehicle is additionally based on the determination of whether a natural disaster is arising.

13. The method of claim 12, wherein the determination of whether a natural disaster is arising is based on a temperature gradient.

14. The method of claim 9, wherein:
the data is indicative of a particulate concentration or a smoke concentration within a threshold radius of the vehicle;
the comparing of the obtained data comprises comparing the particulate concentration or the smoke concentration to a baseline level of a particulate concentration or a smoke concentration; and
the determination of whether of evacuate is in response to determining that the particulate concentration or the smoke concentration deviates from the baseline level by more than a threshold amount.

15. The method of claim 9, further comprising determining one or more velocities at which one or more persons are travelling towards the vehicle; and the determination of whether of evacuate is based on the one or more velocities.

16. The method of claim 9, wherein the determination of the evacuation location is based on a rate of traffic accidents at the evacuation locations.

17. The system of claim 1, wherein the instructions further cause the system to perform:

determining that the second characteristics of the second data deviate from the corresponding characteristics of the reference data by more than respective second thresholds on a first side relative to the vehicle and that the second characteristics of the second data deviate from the corresponding characteristics of the reference data by less than the respective second thresholds on a second side relative to the vehicle; and flashing lights located on the first side of the vehicle while refraining from flashing lights located on the second side of the vehicle.

18. The system of claim 1, wherein the determination of the evacuation location is based on a historical frequency of traffic accidents within a radius of the evacuation locations.

19. The system of claim 1, wherein the determination of the evacuation location is based on a degree of recency of police activity within a radius of the evacuation locations.

20. The system of claim 1, wherein the reference data comprises a level of noise; and the instructions further cause the system to perform:

determining whether to evacuate based on the level of noise.

\* \* \* \* \*